(12) United States Patent
Washino

(10) Patent No.: US 7,631,891 B2
(45) Date of Patent: Dec. 15, 2009

(54) DRIVER-SIDE AIRBAG DEVICE

(75) Inventor: Shigeru Washino, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 12 days.

(21) Appl. No.: 11/844,651

(22) Filed: Aug. 24, 2007

(65) Prior Publication Data

US 2008/0048420 A1 Feb. 28, 2008

(30) Foreign Application Priority Data

Aug. 25, 2006 (JP) ............................... 2006-228692

(51) Int. Cl.
*B60R 21/16* (2006.01)
(52) U.S. Cl. ..................................... 280/731
(58) Field of Classification Search ................ 280/731, 280/743.1, 728.3
See application file for complete search history.

(56) References Cited

U.S. PATENT DOCUMENTS 5,529,337 A * 6/1996 Takeda et al. ............... 280/729
6,224,093 B1 * 5/2001 Ochiai et al. ................ 280/731
6,554,313 B2 * 4/2003 Uchida ........................ 280/729
6,786,505 B2 * 9/2004 Yoshida ....................... 280/729
7,441,799 B2 * 10/2008 Enders et al. ............... 280/731

FOREIGN PATENT DOCUMENTS

| JP | 11-59434 | 3/1999 |
| JP | 11-245759 | 9/1999 |
| JP | 11-342819 | 12/1999 |
| JP | 2007062469 A * | 3/2007 |
| JP | 2007062471 A * | 3/2007 |

* cited by examiner

*Primary Examiner*—Faye M. Fleming
(74) *Attorney, Agent, or Firm*—Oblon, Spivak, McClelland, Maier & Neustadt, L.L.P.

(57) ABSTRACT

A driver-side airbag device includes an airbag folded and housed within a boss portion of a non-circular steering wheel. The airbag is deployed in conformity with a shape of the steering wheel. Further, the airbag is formed of a top and a bottom portion, at least one of which has a non-circular inflated shape that conforms to the shape of the steering wheel.

16 Claims, 9 Drawing Sheets

DRIVER-SIDE AIRBAG DEVICE

INCORPORATION BY REFERENCE

The disclosure of Japanese Patent Application No. 2006-228692 filed on Aug. 25, 2006 including the specification, drawings and abstract is incorporated herein by reference in its entirety.

BACKGROUND OF THE INVENTION

1. Field of the Invention

The present invention relates to a driver-side airbag device.

2. Description of the Related Art

Japanese Patent Application Publication No. 11-245759 (JP-A-11-245759) describes a configuration that includes an inner airbag deployed within the inner side of a steering wheel; and an outer airbag deployed around an outer circumference of the inner airbag to be brought into contact with the front face of the wheel rim. In this configuration, the weight of an occupant is supported by the front face of the wheel rim via the inner airbag and the outer airbag. Such a configuration avoids dislodging of the inner airbag in a lateral direction, which may otherwise be caused by the occupant's weight, and any reduction in restrainability of the inner airbag.

However, the above noted example is to be employed with circular shaped inner and outer airbags that are supported by a steering wheel having a circular shape. For this reason, in case of using a non-circular steering wheel, the shape of the deployed airbag does not match up with the shape of the steering wheel. Consequently, some parts of the airbags that are not supported by the steering wheel are apt to be dislodged toward the traveling direction of a vehicle.

SUMMARY OF THE INVENTION

The present invention provides an airbag that can securely restrain a driver, even when a non-circular steering wheel is employed.

In accordance with a first aspect of the present invention, a driver-side airbag device includes an airbag, folded and housed within a boss portion of a non-circular steering wheel, wherein the airbag is deployed in conformity with a shape of the steering wheel when supplied with a gas by an inflator.

Therefore, it is possible for the steering wheel to support the entire airbag when a driver is restrained by the airbag. This ensures that, in case a non-circular steering wheel is employed, the airbag can securely restrain the driver.

A second aspect of the present invention provides the driver-side airbag device according to the first aspect described above, in which the airbag is formed of a top and a bottom portion, and at least one of the top and the bottom portions is formed a non-circular inflated shape conforming to the shape of the steering wheel.

This helps reduce the possibility that the airbag is dislodged in the traveling direction of the vehicle when the weight of a driver is exerted on the deployed airbag due to the lack of support by the steering wheel of the top or bottom portion of the airbag. Thus, the airbag restrains the driver.

A third aspect of the present invention provides the driver-side airbag device according to the first aspect described above, in which the airbag is configured to restrain mainly the chest of the driver when deployed, and the driver-side airbag device further includes an additional airbag that primarily restrains the head of the driver when deployed.

The driver-side airbag device according to the third aspect makes it possible to reduce unbalanced deceleration between the chest and the head of the driver when the driver is restrained by the airbag and the additional airbag.

BRIEF DESCRIPTION OF THE DRAWINGS

The above and other features and advantages of the present invention will become apparent from the following description of example embodiments given in conjunction with the accompanying drawings, in which.

DETAILED DESCRIPTION OF EMBODIMENTS

Hereinafter, embodiments of the present invention will be described in detail with reference to the accompanying drawings.

Figure 1:
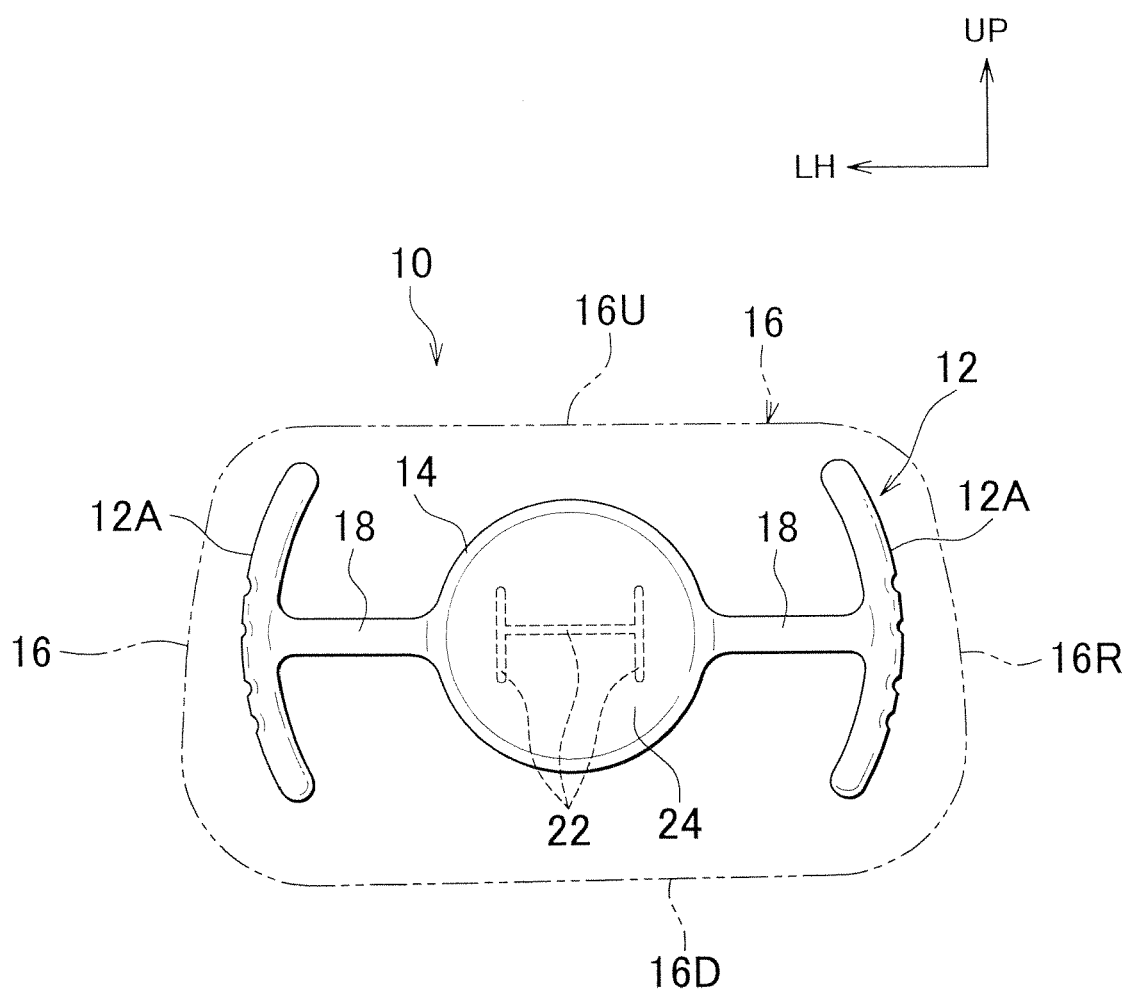
FIG. 1 is a front view in accordance with a first embodiment of the present invention, showing a steering wheel having a driver-side airbag device as seen from a driver seat.

Referring to FIG. 1, a driver-side airbag device 10 of the present embodiment includes an airbag 16 folded and housed in a boss portion 14 of a non-circular steering wheel 12. When supplied with a gas from an inflator (not shown), the airbag 16 is deployed in conformity with a shape of the steering wheel 12.

The steering wheel 12 is, e.g., a non-circular steering wheel for a motor vehicle (not shown) that may be used to greatly change the orientation of vehicle wheels (not shown) only by being operated at a small steering angle. As shown in FIG. 1, the steering wheel 12 has wheel rims 12A formed into, e.g., an arc shape. The wheel rims 12A are, when the steering wheel 12 is in a position to have the vehicle traveling straight, independently arranged on two ends (right and left) of the steering wheel 12 in the lateral direction of the vehicle. The wheel rims 12A are respectively connected to the central boss portion 14 through, e.g., spokes 18.

The airbag 16 and the inflator (not shown) are housed within the boss portion 14 while being normally covered by a pad 24. The pad 24 is provided with a groove-like rupture initiating region 22 which will be ruptured by an inflation pressure of the airbag 16 when deploying and inflating the airbag 16. The boss portion 14 has a diameter which is set, e.g., equal to the longitudinal length of the wheel rims 12A. Thus, the steering wheel 12 has a contour of generally transversely elongated shape when viewed from a driver seat (not shown) when the steering wheel 12 is in a straight driving position.

Figure 2:
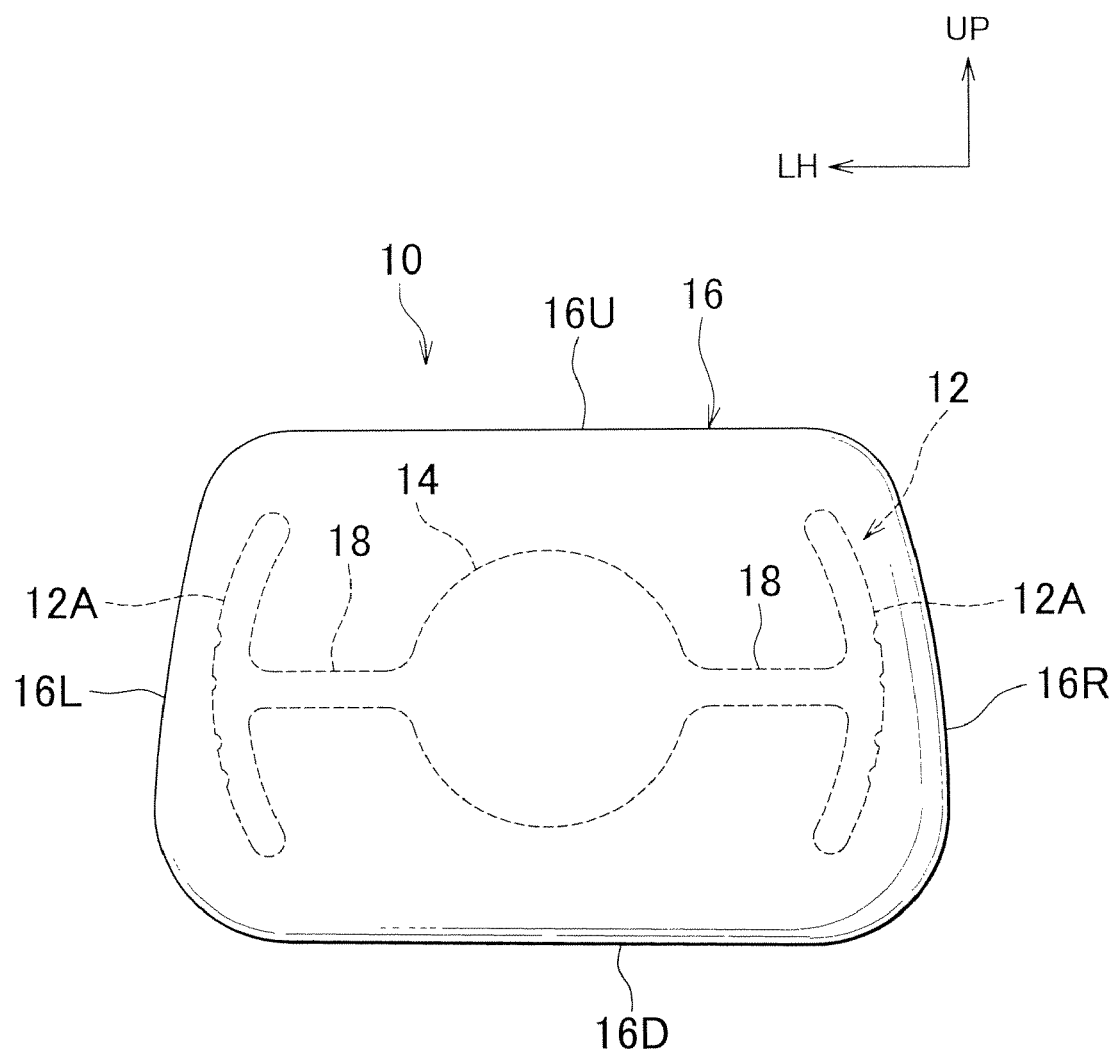
FIG. 2 is a front view in accordance with the first embodiment, illustrating an airbag deployed in conformity with a shape of the steering wheel.

The airbag 16 is configured so that it is inflated into a transversely elongated shape in conformity with the transversely elongated shape of the steering wheel 12. More specifically, as illustrated in FIG. 2, the airbag 16 is configured so that a peripheral edge 16U, which is the top portion of the airbag 16, and a peripheral edge 16D, which is the bottom portion of the airbag 16, may be deployed into a non-circular shape when viewed from the driver seat. The peripheral edge 16U has, e.g., a rectilinear shape corresponding to an envelope curve (not shown) that extends from an upper end of the left wheel rim 12A to an upper end of the right wheel rim 12A via a region above the boss portion 14. Similarly, the peripheral edge 16D has, e.g., a rectilinear shape corresponding to an envelope curve (not shown) that extends from a lower end of the left wheel rim 12A to a lower end of the right wheel rim 12A via a region below the boss portion 14. The airbag 16 has a right edge 16R and a left edge 16L each formed into, e.g., a generally arcuate shape to be in conformity with the shape of the wheel rims 12A.

The inflator arranged within the boss portion 14 is actuated by, e.g., a spark current supplied from an airbag ECU (Electronic Control Unit) not shown in the drawings, to generate and supply a large volume of gas to the airbag 16.

The operation of the driver-side airbag device of the present embodiment configured as above will now be described. In the driver-side airbag device 10 shown in FIGS. 1 and 2, if the airbag ECU detects a frontal collision based on a signal from a sensor not shown in the drawings, the airbag ECU allows a spark current to be fed to the inflator in the boss portion 14. The inflator is actuated by the spark current to generate a large volume of gas. The airbag 16 begins inflate as the gas is supplied thereto.

Figure 3:
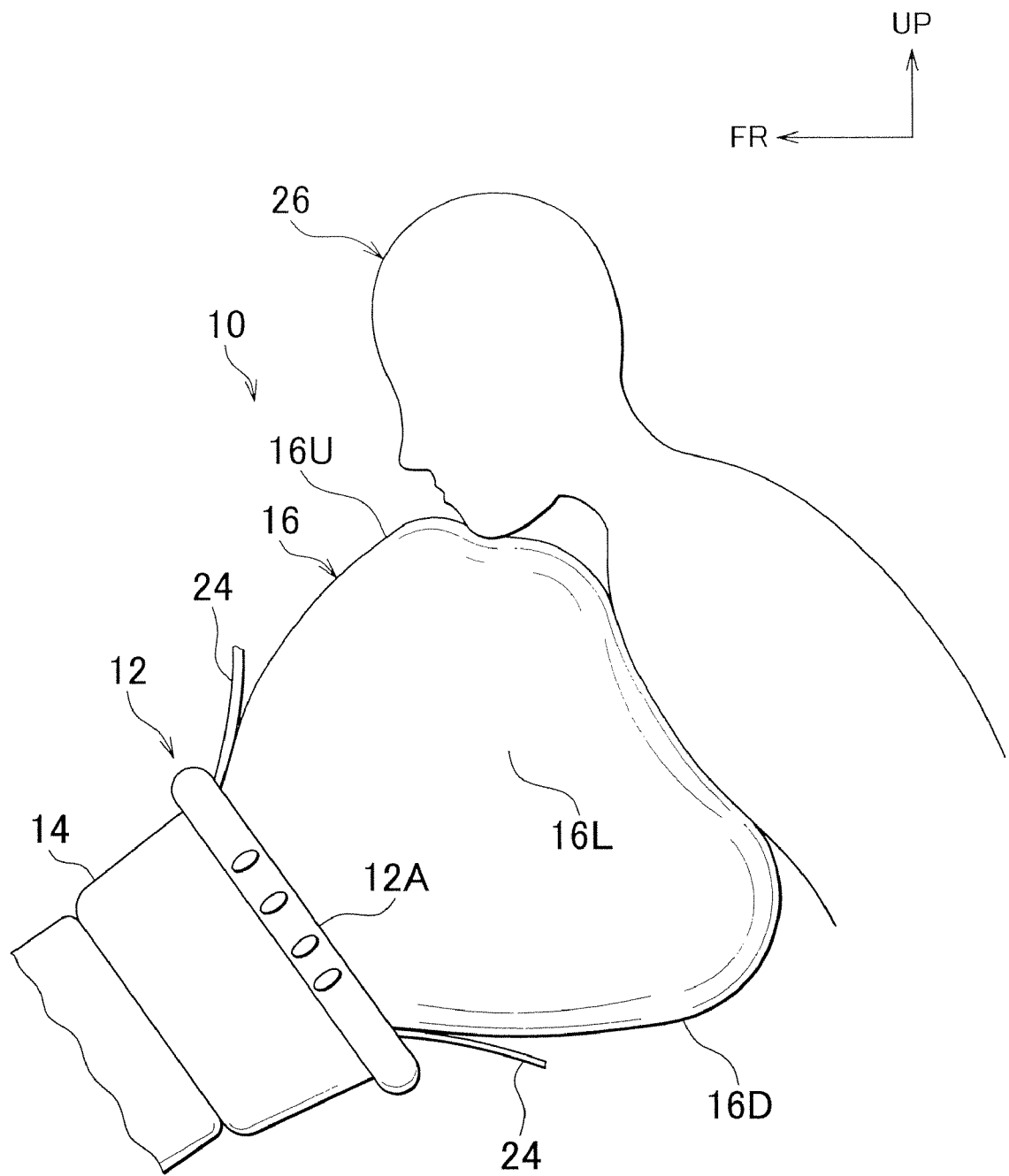
FIG. 3 is a side view in accordance with the first embodiment, illustrating a driver restrained by the deployed airbag.

If the airbag 16 begins inflate, the pad 24 of the boss portion 14 is ruptured in the rupture initiating region 22 by the inflation pressure of the airbag 16 and the airbag 16 is fully deployed between the steering wheel 12 and the driver 26, as illustrated in FIG. 3. At this time, as can be seen in FIG. 2, the airbag 16 is deployed into a transversely elongated shape conforming to the transversely elongated shape of the non-circular steering wheel 12.

More specifically, as shown in FIG. 2, the peripheral edge 16U is deployed into, e.g., a rectilinear shape corresponding to an envelope curve (not shown) that extends from an upper end of the left wheel rim 12A to an upper end of the right wheel rim 12A via a region above the boss portion 14. Similarly, the peripheral edge 16D is deployed into, e.g., a rectilinear shape corresponding to an envelope curve (not shown) that extends from a lower end of the left wheel rim 12A to a lower end of the right wheel rim 12A via a region below the boss portion 14. Furthermore, the right and left edges 16R and 16L of the airbag 16 are respectively deployed into a generally arcuate shape in conformity with the shape of the wheel rims 12A.

Because the airbag 16 is deployed in conformity with the shape of the steering wheel 12 in accordance with the present embodiment as illustrated in FIG. 3, the steering wheel 12 supports the entire airbag 16 when the weight of the driver 26 is exerted on the airbag 16, i.e., when the inertial force of the driver 26 acts against the airbag 16. More specifically, the top peripheral edge 16U of the airbag 16 is supported by the top ends of the left and right wheel rims 12A and the top area of the boss portion 14. The bottom peripheral edge 16D is supported by the bottom ends of the left and right wheel rims 12A and the bottom area of the boss portion 14. This helps to eliminate some parts of the airbag 16, e.g., the top or bottom portion of the airbag 16, from being dislodged in the direction in which the vehicle is traveling, when the weight of the driver 26 is exerted on the airbag 16, because the steering wheel 12 supports the airbag 16. Therefore, the airbag 16 can securely restrain the driver 26 when deployed.

Figure 4:
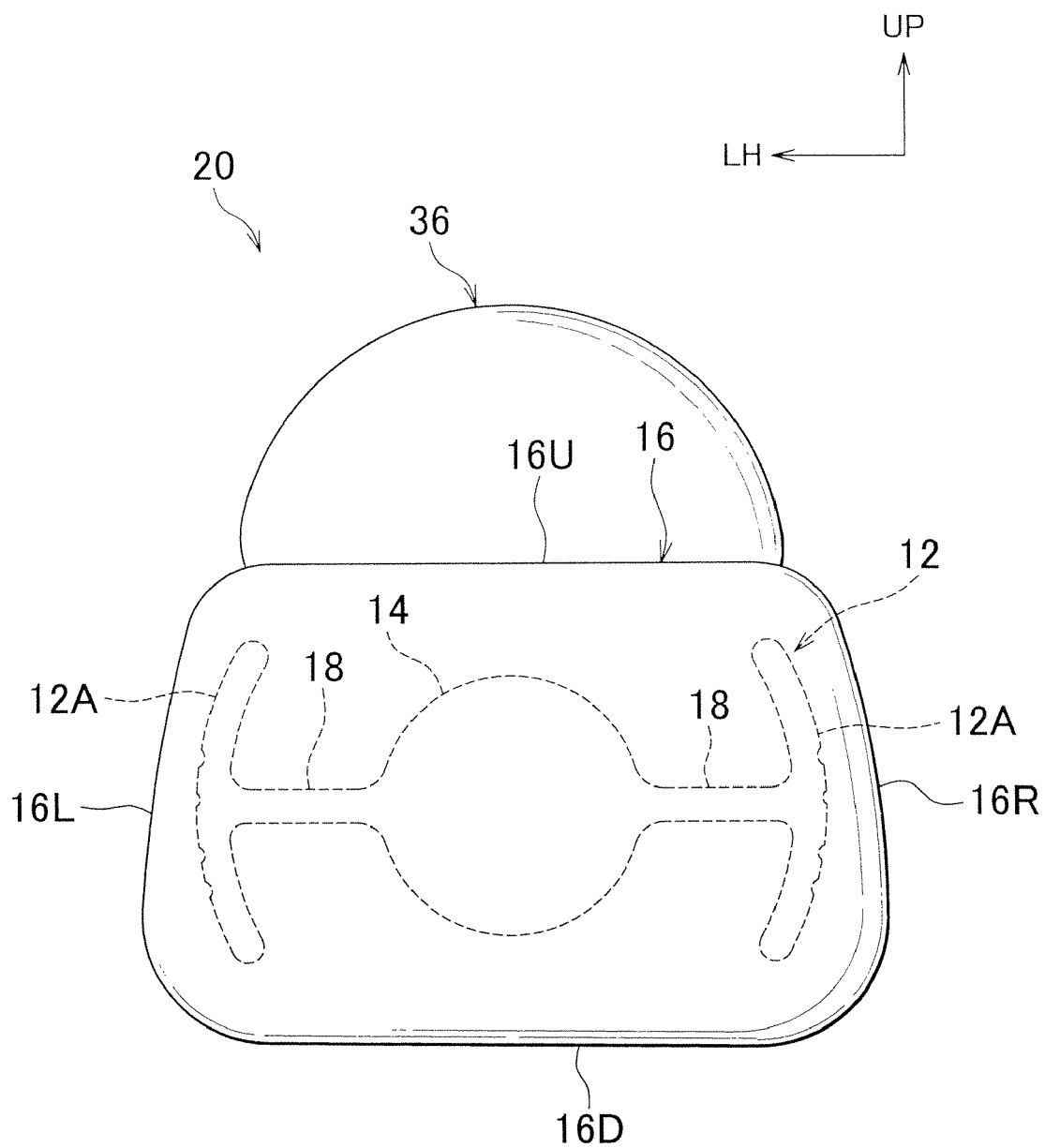
FIG. 4 is a front view in accordance with a second embodiment of the present invention, illustrating an airbag and an additional airbag both deployed, as seen from the driver seat.
Figure 5:
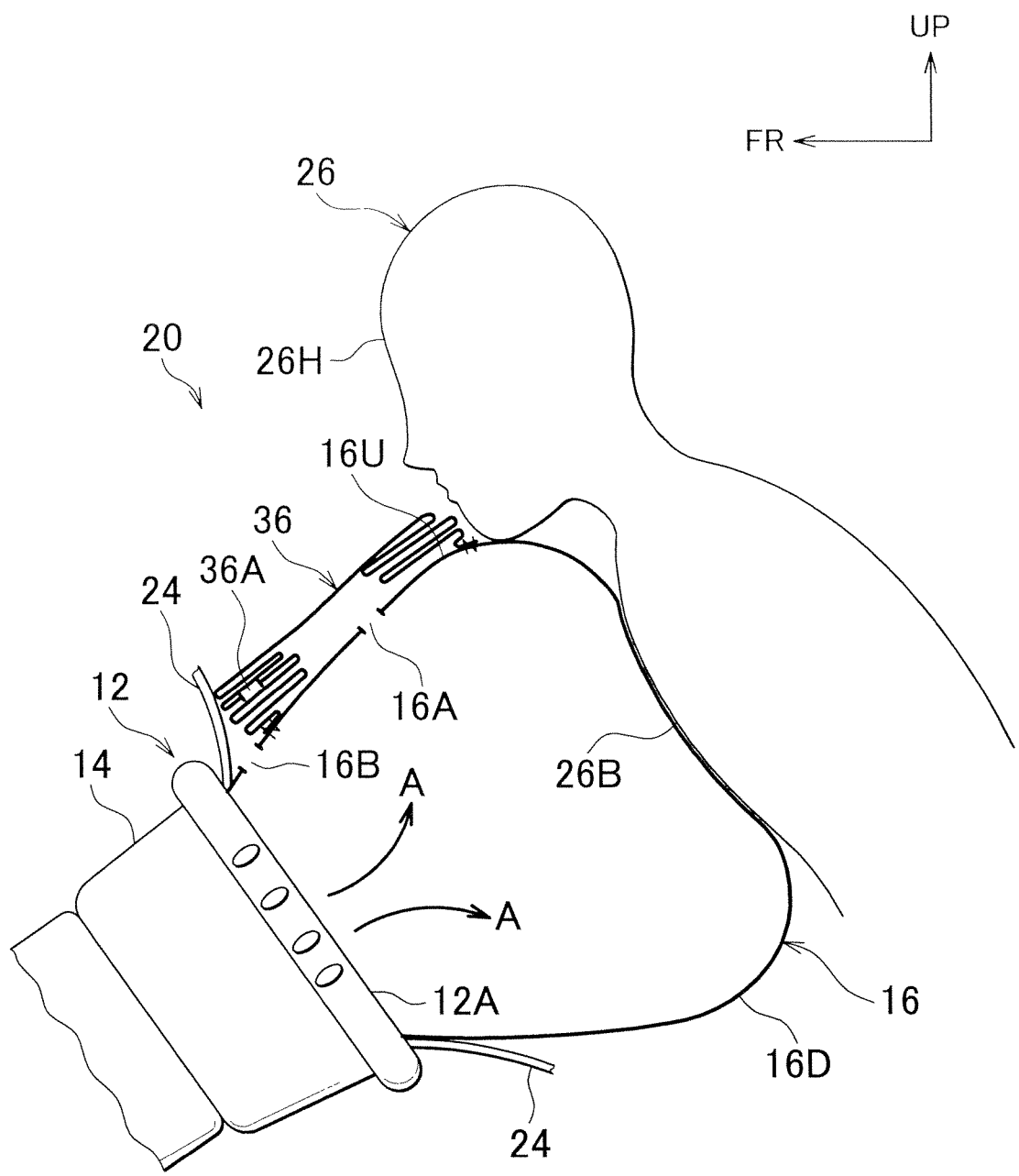
FIG. 5 is a side view in accordance with the second embodiment, illustrating that the airbag is deployed but the additional airbag is not yet deployed.

Referring to FIG. 4, the driver-side airbag device 20 in accordance with a second embodiment of the present invention ensures that the airbag 16 restrains mainly the chest 26B of the driver 26 when deployed (see FIG. 5). The driver-side airbag device 20 further includes an additional airbag 36 in addition to the airbag 16.

Figure 6:
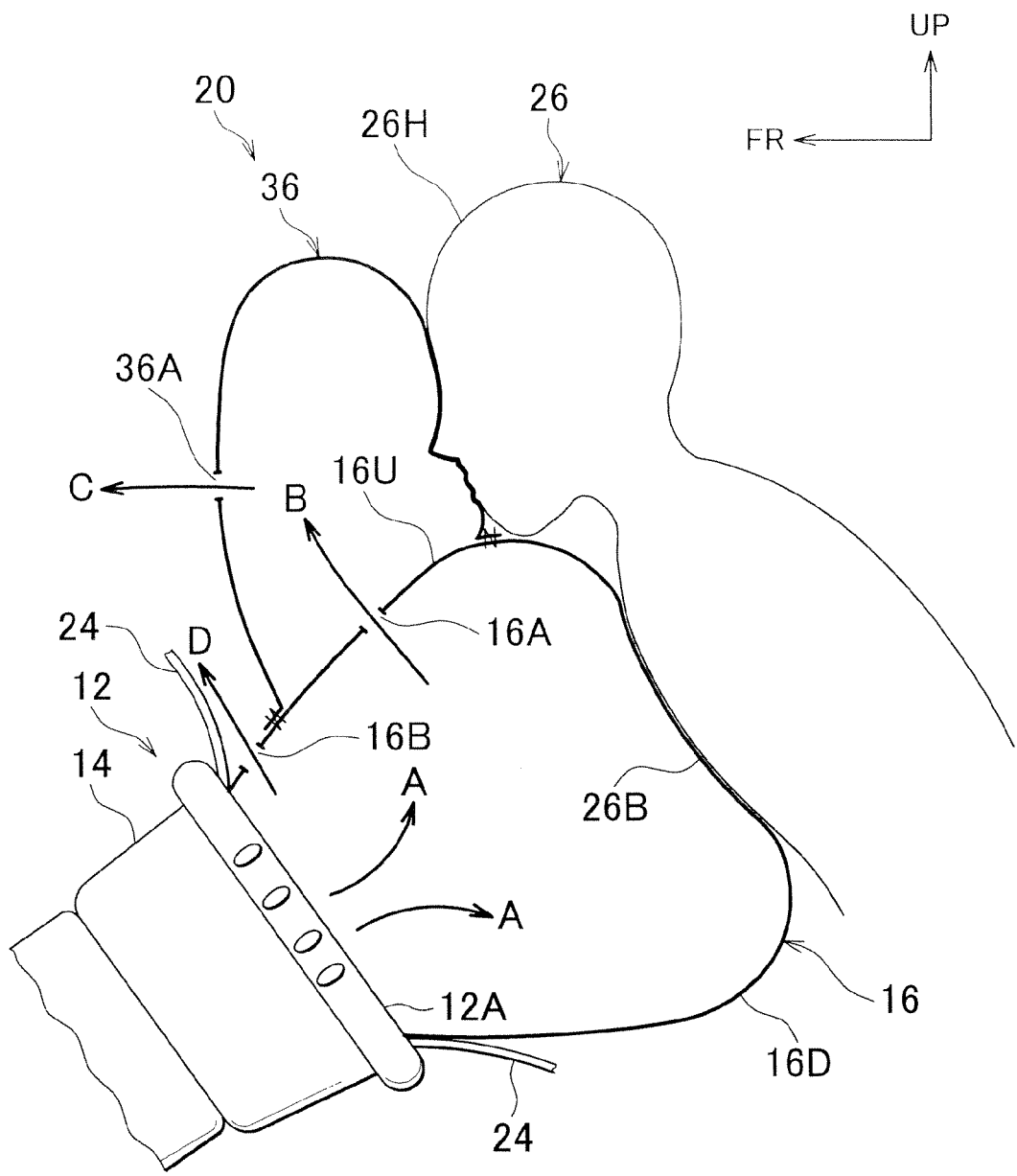
FIG. 6 is a sectional view in accordance with the second embodiment, illustrating that the additional airbag is deployed followed by the state shown in FIG. 5, in which the chest of a driver is restrained mainly by the airbag and the head of the occupant is restrained primarily by the additional airbag.

As shown in FIG. 6, the additional airbag 36 primarily restrains the head 26H of the driver 26 when deployed. The inflated volume of the additional airbag 36 is smaller than that of the airbag 16 because of the difference in inertial force between the head 26H and the chest 26B at the time of a frontal collision. The additional airbag 36 is, e.g., sewn to the top peripheral edge 16U of the airbag 16 and is folded and housed in the boss portion 14 together with the airbag 16. A vent hole 36A, which regulates gas pressure in the additional airbag 36, is provided at the additional airbag 36.

As shown in FIGS. 5 and 6, the airbag 16 has a passage hole 16A through which the gas supplied into the airbag 16 is supplied to the additional airbag 36 and a vent hole 16B to regulate pressure. The gas provided by the inflator (not shown) is first supplied into the airbag 16, e.g., in the direction of arrows A as illustrated in FIG. 5 and then supplied into the additional airbag 36 through the passage hole 16A in the direction of arrow B as illustrated in FIG. 6.

Other parts are the same as those of the first embodiment. Therefore, like parts are designated by the same reference numerals in the drawings and description will be omitted in that regard.

The operation of the driver-side airbag device in accordance with the second embodiment of the present invention will be described. In the driver-side airbag device 20 shown in FIG. 5, if the airbag ECU detects a frontal collision from a signal generated by a sensor (not shown in the drawings), the airbag ECU allows a spark current to be fed to the inflator in the boss portion 14. The inflator is actuated by the spark current to generate a large volume of gas. This gas is supplied to the airbag 16 in the direction of arrow A, whereby the airbag 16 begins inflate between the steering wheel 12 and the driver 26. After the gas is fully supplied to the airbag 16 from the inflator, it flows into the additional airbag 36 through the passage hole 16A in the direction of arrow B as illustrated in FIG. 6. This enables the additional airbag 36 to be deployed.

As illustrated in FIG. 4, the deflated shape of the airbag 16 when viewed from the driver seat is a transversely elongated shape corresponding to that of the steering wheel 12. The deflated shape of the additional airbag 36 when viewed from the driver seat is, e.g., a semicircular shape. However, the deflated shape of the additional airbag 36 is not limited thereto.

Referring to FIG. 6, as the airbag 16 and the additional airbag 36 are deployed in this way, the airbag 16 mainly restrains the chest 26B of the driver 26 and the additional airbag 36 primarily restrains the head 26H of the driver 26. At this time, the gas is appropriately exhausted through the vent holes 16B and 36B by the inertial force of the driver 26, thereby regulating the pressure within the airbag 16 and the additional airbag 36. This makes it possible to restrain the chest 26B and the head 26H, thereby properly decelerating the driver upon impact. The restraining characteristics of both the airbag 16 and the additional airbag 36 may be suitably adjusted by changing the aperture size of the vent holes 16B and 36B and the passage hole 16A.

In this way, the driver-side airbag device 20 reduces unbalanced deceleration between the chest 26B and the head 26H of the driver 26 when the driver 26 is restrained by the airbag 16 and the additional airbag 36.

The additional airbag 36 is deployed in a vehicle height position above the steering wheel 12 and therefore is not supported by the steering wheel 12 when the additional airbag 36 restrains the head 26H. Inasmuch as the head 26H has an inertial force smaller than that of the chest 26B, there is no possibility that the absence of support of the steering wheel 12 heavily affects the capability of restraining the head 26H. It is the same as in the first embodiment that the capability of restraining the chest 26B is secured by the airbag 16 deployed in conformity with the transversely elongated shape of the steering wheel 12.

Figure 7:
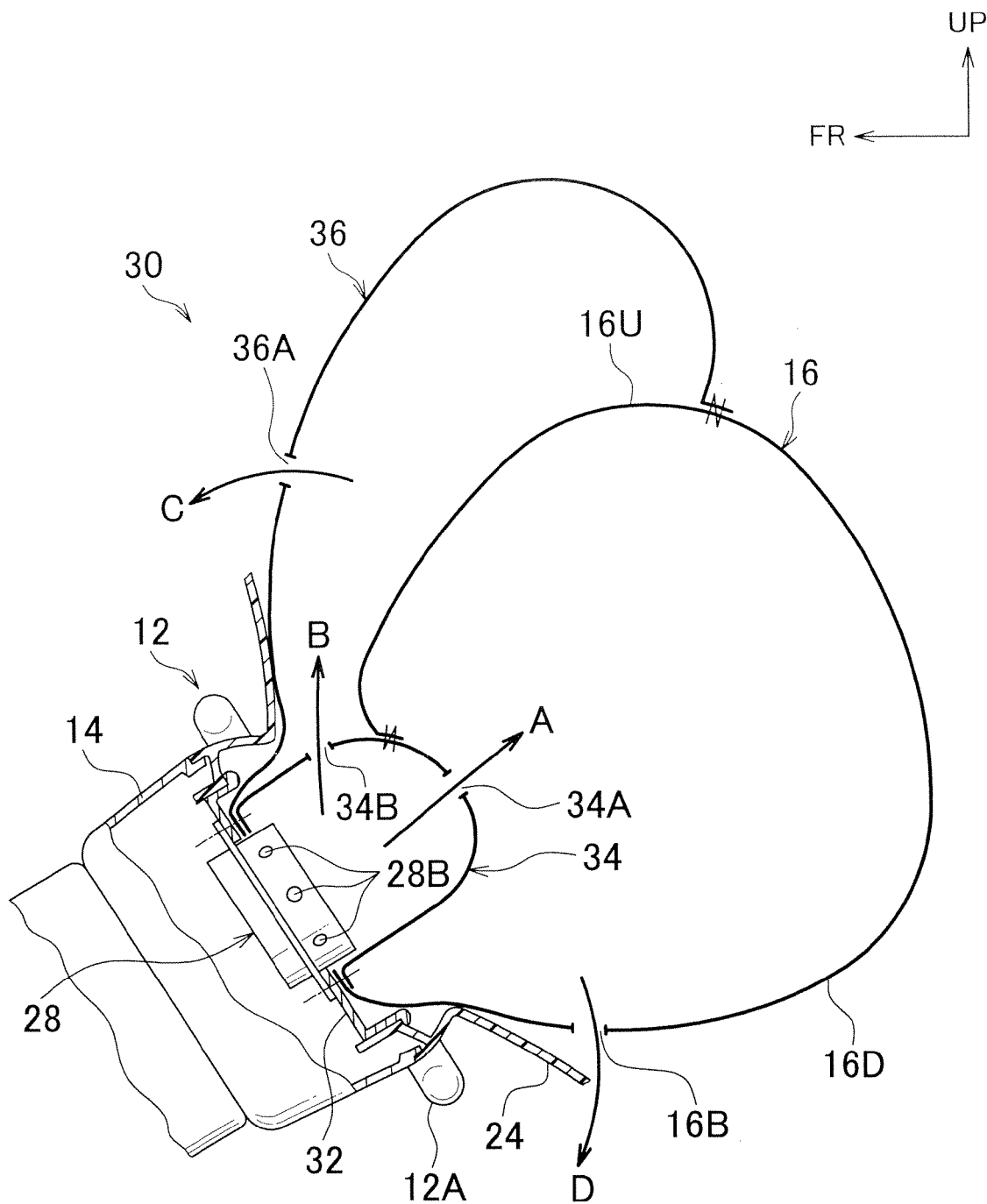
FIG. 7 is a sectional view in accordance with a third embodiment of the present invention, illustrating that an airbag and an additional airbag are deployed by a gas supplied from an inflator.

In a driver-side airbag device 30 in accordance with the embodiment of the present invention shown in FIG. 7, an inflator 28 is provided within the boss portion 14 by means of a retainer 32 and a gas distributing member 34 is provided on the side of the gas outlets 28A of the inflator 28. When in normal use, the gas distributing member 34 is folded and housed within the boss portion 14 together with the airbag 16 and the additional airbag 36.

The gas distributing member 34 has a passage hole 34A through which the gas from the inflator 28 is supplied to the airbag 16 and a passage hole 34B through which gas is supplied to the additional airbag 36. When the inflator 28 is actuated, the gas is distributed from the gas distributing member 34 to the airbag 16 and the additional airbag 36.

Other parts are the same as those of the second embodiment. Therefore, like parts are designated by the same reference numerals in the drawings and description will be omitted in that regard.

The operation of the driver-side airbag device in accordance with the third embodiment of the present invention configured as above. In the driver-side airbag device 30 shown in FIG. 7, if the airbag ECU detects a frontal collision based on a signal from a sensor not shown in the drawings, the airbag ECU allows a spark current to be fed to the inflator 28 in the boss portion 14. The inflator 28 is actuated by the spark current to thereby generate a large quantity of gas. This gas is supplied to the airbag 16 in the direction of arrow A through the passage hole 34A of the gas distributing member 34 and also supplied to the additional airbag 36 in the direction of arrow B through the passage hole 34B of the gas distributing member 34. As the airbag 16 and the additional airbag 36 are supplied with the gas in this way, they are deployed from the boss portion 14 between the steering wheel 12 and the driver 26.

Figure 8:
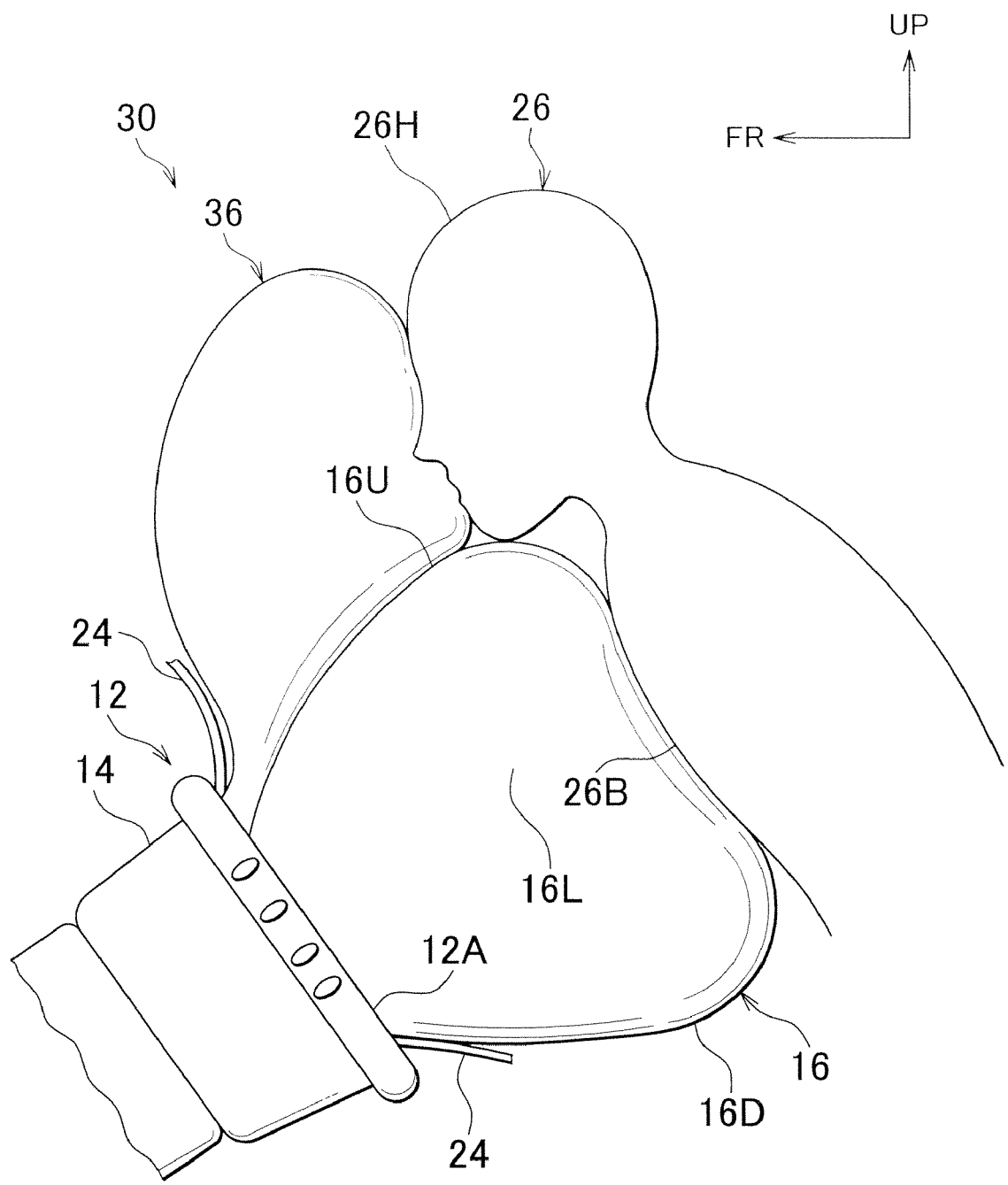
FIG. 8 is a side view in accordance with the third embodiment, illustrating that the chest of a driver is restrained mainly by the airbag and the head of the driver is restrained primarily by the additional airbag.

As the airbag 16 and the additional airbag 36 are deployed as illustrated in FIG. 8, the airbag 16 mainly restrains the chest 26B of the driver 26 and the additional airbag 36 primarily restrains the head 26H of the driver 26. At this time, as illustrated in FIG. 7, the gas is appropriately exhausted through the vent hole 16B in the direction of arrow D and also through the vent hole 36A in the direction of arrow C by the inertial force of the driver 26, thereby regulating the pressure within the airbag 16 and the additional airbag 36. This makes it possible to restrain the chest 26B and the head 26H as depicted in FIG. 8, thereby appropriately decelerating the drive upon impact. Referring to FIG. 7, the restraining characteristics of the airbag 16 and the additional airbag 36 may be suitably adjusted by changing the aperture size of the vent holes 16B and 36A and the passage holes 34A and 34B.

In this way, the driver-side airbag device 30 reduces unbalanced deceleration between the chest 26B and the head 26H of the driver 26 when the driver 26 is restrained by the airbag 16 and the additional airbag 36.

As with the second embodiment, although the additional airbag 36 is not supported by the steering wheel 12 when restraining the head 26H with the additional airbag 36, the capability of restraining the head 26H is not heavily impinged on.

Figure 9:
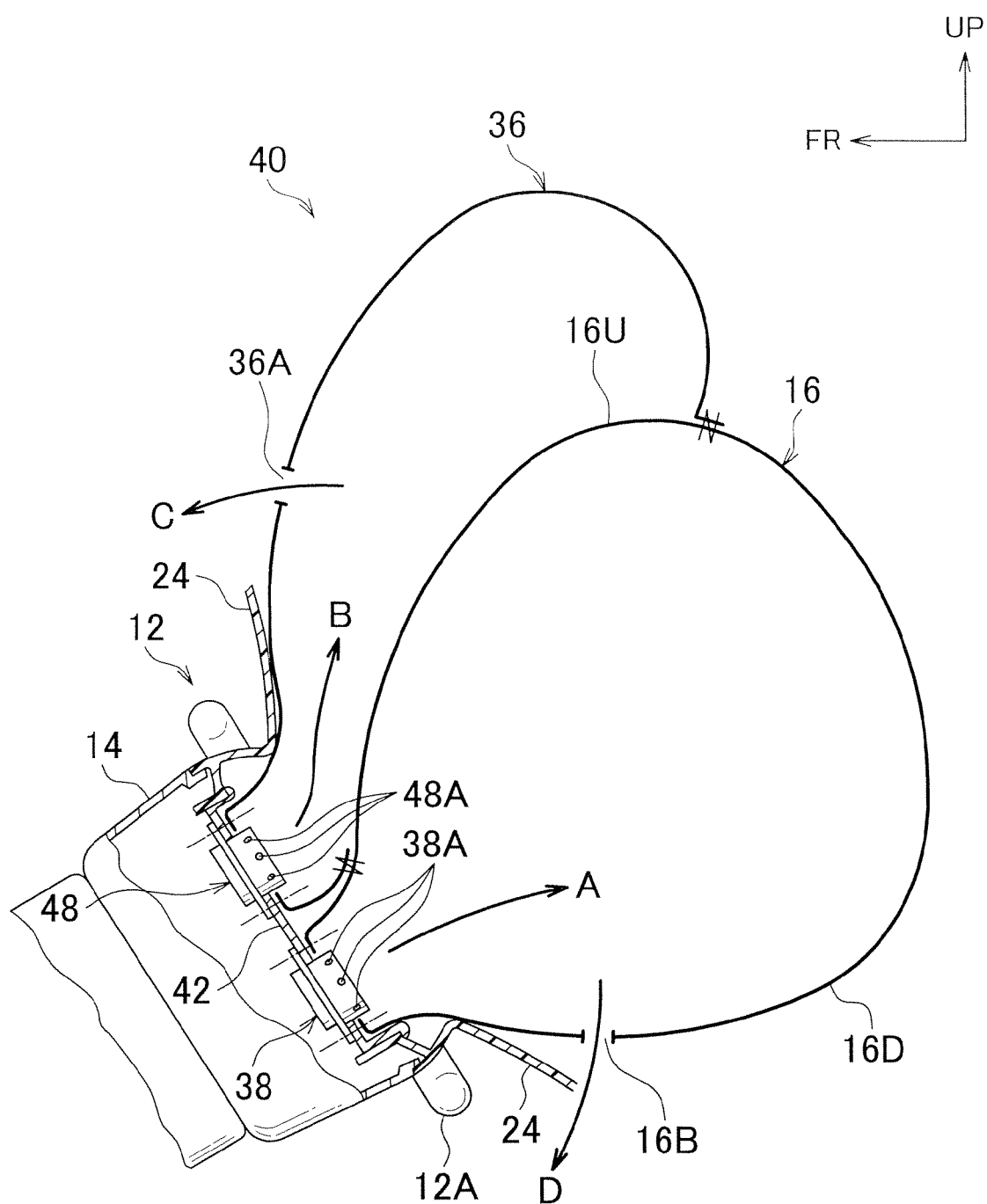
FIG. 9 is a sectional view in accordance with a fourth embodiment of the present invention, illustrating that an airbag and an additional airbag are deployed by a gas separately supplied from two inflators.

Referring to FIG. 9, a driver-side airbag device 40 in accordance with a fourth embodiment of the present invention includes an inflator 38 which supplies a gas to the airbag 16 and an inflator 48 which supplies the gas to the additional airbag 36. The inflators 38 and 48 are provided within the boss portion 14 via a retainer 42. The airbag 16 is installed on gas outlets 38A of the inflator 38 and the additional airbag 36 is installed on gas outlets 48A of the inflator 48.

Other parts are the same as those of the second embodiment. Therefore, like parts are designated by the same reference numerals in the drawings and description will be omitted in that regard.

The operation of the driver-side airbag device of the present embodiment will be described. In the driver-side airbag device 40 shown in FIG. 9, if the airbag ECU detects a frontal collision based on a signal from a sensor (not shown in the drawings), the airbag ECU allows a spark current to be fed to the inflators 38 and 48 in the boss portion 14. The inflators 38 and 48 are actuated by the spark current to thereby generate a large volume of gas. The gas discharged from the gas outlets 38A of the inflator 38 is supplied to the airbag 16 and the gas discharged from the gas outlets 48A of the inflator 48 is supplied to the additional airbag 36. The actuation timing of the inflators 38 and 48 is not limited to simultaneous one and may be set arbitrarily.

Similar to the third embodiment shown in FIG. 3, as the airbag 16 and the additional airbag 36 are supplied with the gas in this way, they are deployed from the boss portion 14 between the steering wheel 12 and the driver 26. This makes it possible for the airbag 16 to restrain mainly the chest 26B of the driver 26 and for the additional airbag 36 to restrain primarily the head 26H of the driver 26.

At this time, as illustrated in FIG. 9, the gas is appropriately exhausted through the vent hole 16B in a direction of arrow D and also through the vent hole 36A in a direction of arrow C by the inertial force of the driver 26 to thereby regulate the pressure within the airbag 16 and the additional airbag 36. This makes it possible to restrain the chest 26B and the head 26H as in the third embodiment depicted in FIG. 8, thereby appropriately decelerating the driver upon impact. Referring to FIG. 9, the restraining characteristics of the airbag 16 and the additional airbag 36 may be suitably adjusted by changing the output power of the inflators 38 and 48 or the aperture size of the vent holes 16B and 36A.

In this way, the driver-side airbag device 40 decelerates the chest 26B and the head 26H of the driver 26 at a substantially same rate, when restraining the driver 26 with the use of the airbag 16 and the additional airbag 36. Furthermore, because the gas is independently supplied to the airbag 16 and the additional airbag 36 from the inflators 38 and 48 when the driver-side airbag device 40 is in operation, there is no need to provide a passage hole between the airbag 16 and the additional airbag 36 and the deployment of the airbag 16 and the additional airbag 36 may be suitably controlled. As with the second and third embodiments, although the additional airbag 36 is not supported by the steering wheel 12 when the additional airbag 36 restrains the head 26H, the capability of restraining the head 26H is not heavily impinged on.

In the respective embodiments described above, the steering wheel 12 is configured to have the wheel rims 12A formed into, e.g., an arc shape. Further, the wheel rims 12A is independently arranged on two ends of the steering wheel 12 in a lateral direction of the vehicle, when the steering wheel 12 is positioned to have the vehicle traveling straight. However, the shape of the steering wheel 12 is not limited thereto. Alternatively, it may be possible to employ, e.g., a continuous wheel rim, the upper and lower portions of which are non-circular and the remaining portions of which are circular when viewed in a straight-ahead state. As a further alternative, it may be possible to use, e.g., a generally elliptical wheel rim or a generally rectangular wheel rim, either of which is transversely elongated as a whole. In this case, the airbag 16 is designed so that it is deployed in conformity with the shape of each of the steering wheel.

While the invention has been shown and described with respect to the example embodiments, it will be understood by those skilled in the art that various changes and modifications may be made without departing from the spirit and scope of the invention as defined in the following claims.

What is claimed is:

1. A driver-side airbag device comprising:
    an airbag, folded and housed within a boss portion of a non-circular steering wheel; and
    an additional airbag adjacent to the airbag,
    wherein the airbag is deployed in conformity with a shape of the non-circular steering wheel when supplied with a gas by an inflator,
    wherein the airbag covers a center portion of the steering wheel,
    wherein the airbag includes a first vent hole that allows gas inside the airbag to pass directly to the external environment exposed to the steering wheel, and the additional airbag includes a second vent hole that allows gas inside the additional airbag to pass directly to the external environment exposed to the steering wheel,
    wherein the airbag mainly restrains a chest of a driver when deployed, and
    wherein the additional airbag primarily restrains a head of the driver when deployed.

2. The driver-side airbag device according to claim 1, wherein the airbag has a top and a bottom portion, and at least one of which portion has a non-circular inflated shape that conforms to the shape of the steering wheel.

3. The driver-side airbag device according to claim 1, wherein the inflated volume of the additional airbag is smaller than that of the airbag.

4. The driver-side airbag device according to claim 1, wherein the airbag has a passage hole through which the gas supplied from the inflator into the airbag is supplied to the additional airbag.

5. The driver-side airbag device according to claim 1, further comprising a gas distributing member folded and housed within the boss portion with the airbag and the additional airbag,
    wherein, upon actuating the inflator, gas is distributed from the gas distributing member to the airbag and the additional airbag.

6. The driver-side airbag device according to the claim 5, wherein the gas distributing member includes:
    a first passage hole through which a gas supplied from the inflator is supplied to the airbag; and
    a second passage hole through which a gas supplied from the inflator is supplied to the additional airbag.

7. The driver-side airbag device according to claim 1, wherein the inflator supplies the gas to the airbag, and
    wherein the driver-side airbag device further comprises an additional inflator which supplies a gas to the additional airbag.

8. The driver-side airbag device according to claim 7, wherein the inflator and the additional inflator are provided within the boss portion via a retainer.

9. The driver-side airbag device according to claim 1, wherein the steering wheel includes wheel rims each of which is formed into an arc shape, and that are, when the steering wheel is in a position to have the vehicle traveling straight, independently arranged on two ends of the steering wheel in the lateral direction of the vehicle.

10. The driver-side airbag device according to claim 1, wherein the steering wheel has a contour of generally transversely elongated shape when the steering wheel is in a straight driving position.

11. A driver-side airbag device comprising:
    an airbag, folded and housed within a boss portion of a non-circular steering wheel, wherein
    the airbag is deployed in conformity with a shape of the non-circular steering wheel when supplied with a gas by an inflator,
    the airbag covers a center portion of the steering wheel,
    wherein the airbag mainly restrains a chest of a driver when deployed,
    wherein the driver-side airbag device further comprises an additional airbag that primarily restrains a head of the driver when deployed,
    wherein the inflator supplies the gas to the airbag,
    wherein the driver-side airbag device further comprises an additional inflator which supplies a gas to the additional airbag,
    wherein the inflator and the additional inflator are provided within the boss portion via a retainer, and
    wherein the inflator and the additional inflator are disposed laterally offset from each other as viewed from a direction of inflation to the airbag.

12. A driver-side airbag device comprising:
    an airbag, folded and housed within a boss portion of a non-circular steering wheel, wherein
    the airbag is deployed in conformity with a shape of the non-circular steering wheel when supplied with a gas by an inflator,
    the airbag covers a center portion of the steering wheel,
    wherein the airbag mainly restrains a chest of a driver when deployed,
    wherein the driver-side airbag device further comprises an additional airbag that primarily restrains a head of the driver when deployed,
    wherein the inflated volume of the additional airbag is smaller than that of the airbag, and
    wherein the additional airbag includes a first vent hole through which gas escapes the additional airbag when the additional airbag is deployed.

13. The driver-side airbag device according to claim 12, wherein the additional airbag is directly connected to the boss portion, and the additional airbag is directly connected to the airbag.

14. The driver-side airbag device according to claim 13, wherein the airbag includes a second vent hole through which second vent hole gas escapes from the airbag and enters an area external to the airbag and the additional airbag.

15. The driver-side airbag device according to claim 1, wherein the first and second vent holes are disposed on opposite sides of a center of the steering wheel.

16. The driver-side airbag device according to claim 1, wherein the additional airbag is disposed on a same side of the airbag as the first vent hole.

* * * * *